United States Patent [19]

Gerve

[11] Patent Number: 4,777,821
[45] Date of Patent: Oct. 18, 1988

[54] MEASURING APPARATUS FOR MEASURING THE ALTERATION OF A LIQUID QUANTITY, ESPECIALLY THE QUANTITY OF OIL IN AN INTERNAL COMBUSTION ENGINE

[76] Inventor: Andreas Gerve, Kriegsstr, 180, 7500 Karlsruhe, Fed. Rep. of Germany

[21] Appl. No.: 919,706

[22] Filed: Oct. 16, 1986

[30] Foreign Application Priority Data

Oct. 18, 1985 [DE] Fed. Rep. of Germany ....... 3537192

[51] Int. Cl.$^4$ ............................................. G01F 23/00
[52] U.S. Cl. ............................ 73/290 V; 73/290 R; 367/908
[58] Field of Search ................. 73/290 R, 290 V, 292, 73/295, 290 B; 367/901, 908; 374/127, 119; 340/621

[56] References Cited

U.S. PATENT DOCUMENTS

| | | | |
|---|---|---|---|
| 3,241,368 | 3/1966 | Newitt | 73/290 B |
| 3,589,196 | 6/1971 | Passaic et al. | 367/908 |
| 3,727,029 | 4/1973 | Chrow | 138/33 |
| 4,161,647 | 7/1979 | Carbonnel | 138/33 |
| 4,337,656 | 7/1982 | Rapp | 73/290 V |
| 4,531,406 | 7/1985 | Fritz | 73/290 V |

FOREIGN PATENT DOCUMENTS

| | | | |
|---|---|---|---|
| 1250563 | 12/1960 | France | 73/290 V |
| 61619 | 5/1981 | Japan | 73/290 V |
| 2017915 | 10/1979 | United Kingdom | 73/290 V |
| 2069136 | 8/1981 | United Kingdom | 73/295 |

Primary Examiner—William A. Cuchlinski, Jr.
Assistant Examiner—W. Morris Worth
Attorney, Agent, or Firm—L. Lawton Rogers, III; Joseph M. Killeen

[57] ABSTRACT

A measuring apparatus for accurately measuring the alteration of a liquid quantity, especially the quantity of oil in an internal combustion engine, in a reservoir containing said liquid, especially the oil pan of the internal combustion engine, comprises a measuring chamber which is separate from the reservoir and communicated thereto via a liquid compensator conduit. The liquid compensator conduit and the measuring chamber are heated to a constant temperature by heater. A level sensor for measuring the propagation of a sonic signal is disposed within the measuring chamber above the liquid level. Any temperature variations in the measuring chamber above the liquid level are detected by a gas thermometer and are utilized in an evaluator unit for correcting the measured level signal. The temperature of the liquid, which is measured in the liquid compensator conduit either near the measuring chamber or in said chamber itself, is supplied to a control unit connected to the evaluator unit for acting on the heater to keep the temperature constant.

8 Claims, 1 Drawing Sheet

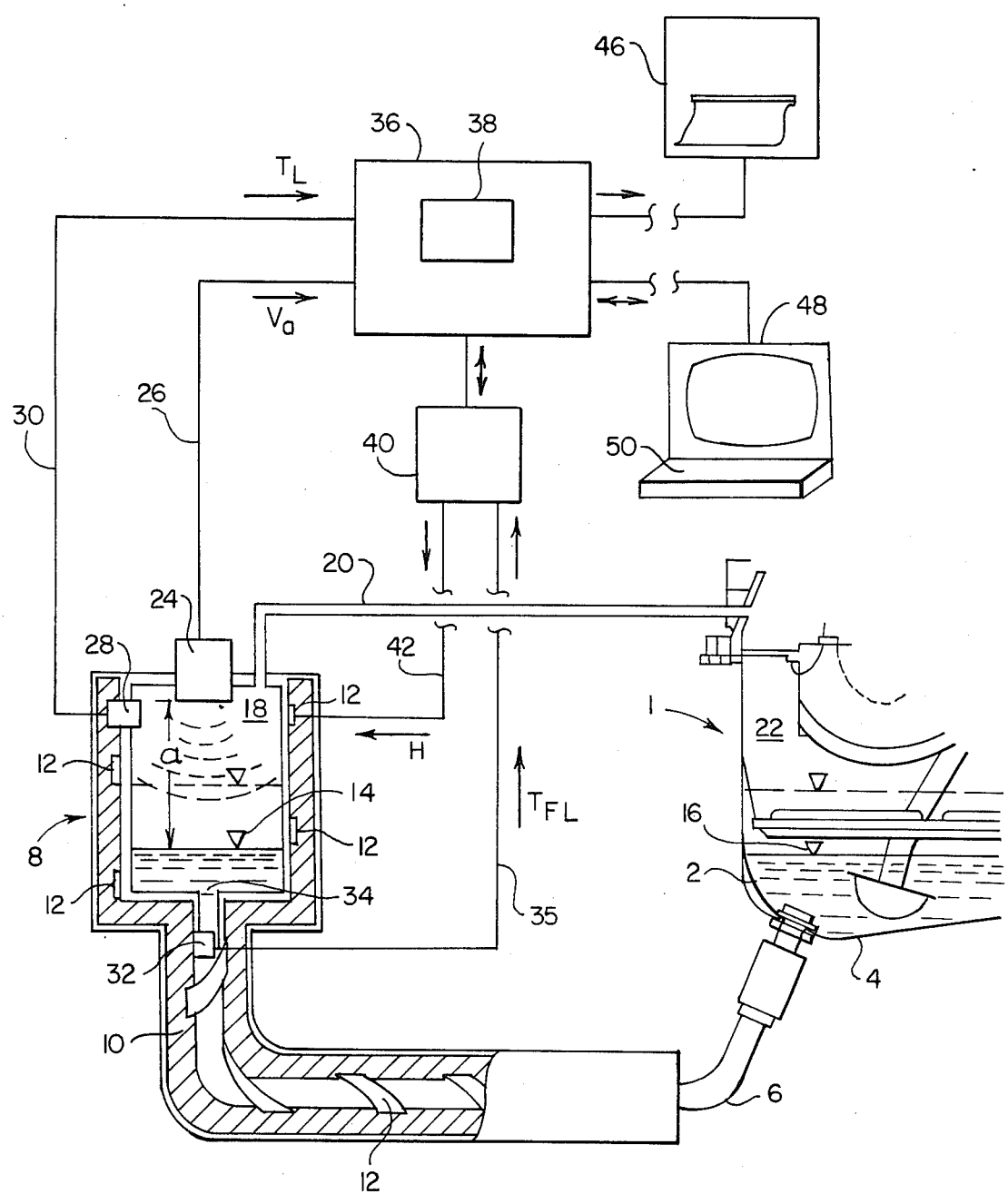

MEASURING APPARATUS FOR MEASURING THE ALTERATION OF A LIQUID QUANTITY, ESPECIALLY THE QUANTITY OF OIL IN AN INTERNAL COMBUSTION ENGINE

The invention is directed to a measuring apparatus for measuring the alteration of a liquid quantity, especially the quantity of oil in an internal combustion engine, in a reservoir containing said liquid, especially an oil pan.

A known measuring apparatus for oil consumption measurements is based on the use of a radionuclide measuring technique (DE-Z Motortechnische Zeitschrift 41 (1980), pp. 317 et seq., work by G. Fritzsche and A. Gervé, "Die Verfahren der Radionuklidtechnik für Ölverbrauchsmessungen"). In this method the oil is labelled radioactively. At the exhaust system the radioactive atoms in the exhaust gas are extracted as samples. The magnitude of the radiation constitutes a value for the oil escaping via the exhaust. This method allows operational measurements with the engine running so that the oil consumption can be accurately measured in response to the operating conditions. However, this method is very expensive and requires additional costs in view of the regulations pertaining to radiation protection.

In a further method of measuring the oil consumption the filled oil is initially extracted from the oil pan by a suction device until air is extracted. This oil quantity is weighed and then refilled. Following operation of the internal combustion engine under defined conditions, the oil is again extracted by suction until air is extracted. As the mouth of the suction device is always kept at the same level, the oil consumption may be determined from the difference between the initial weight and the weight of the oil subsequent to engine operation. Instead of sucking the oil from the oil pan it is also possible to extract oil from a compensator reservoir disposed externally of the engine. This method does not permit operational measurements with the internal combustion engine running; it does not provide sufficiently accurate results.

In a further method of measuring the oil consumption the oil pan is removed from the engine and is replaced by an oil pan which is separated therefrom. This pan is weighed together with its oil content while the engine is running. Measurement can only take place when the engine is stabilized at a given operating point. The increase in the weight function with time provides a value for the alteration of the oil quantity with time and thus for the oil consumption. It is a drawback of this method that the oil consumption cannot be measured in the original state but only after removal of the oil pan or replacement of the oil pan by an oil pan adapted to be weighed separately. This is cumbersome and again results in inaccuracies.

Finally, the so-called "drain-off method" is known for measuring the oil consumption. At the start of the measurement of oil consumption according to this method the engine is run up to a predetermined operating point until the temperature and the viscosity of the oil are stabilized. Then, the engine is stopped and the oil is drained off for a predetermined period of time, the drained oil quantity is weighed, and the drained oil is refilled entirely.

To the engineer designing an internal combustion engine, the described known methods are not yet fully satisfactory for the specified reasons. For him, a sufficiently accurate measurement of oil consumption would be desirable, which for example in case of a 100 KW-engine permits measurement of the oil consumption down to a few g/h during a test run of a few hours in relation to any desired operating point of the engine, while any structural alteration of the engine should be avoided as far as possible.

But the accurate determination of liquid consumption is not only of importance in conjunction with an internal combustion engine. For instance, in process engineering the accurate measurement of liquid consumption is also necessary when it is required to exactly maintain a liquid level. Accurate liquid level measurement is the prerequisite for accurate control of the liquid level wherever liquids are consumed and accurate control of liquid replenishment is necessary.

Accordingly, it is the object of the invention to provide a measuring apparatus for measuring the alteration of a liquid quantity, said apparatus permitting highly exact measurements under realistic operating conditions of liquid consumption at comparatively little expense, wherein any serious structural alteration of the liquid consuming technical apparatus such as an internal combustion engine is avoided.

To solve said object, a measuring apparatus of the kind described comprises in accordance with the invention (a) a measuring chamber being communicated to the reservoir via a liquid compensator conduit,
(b) level measuring means based on measuring the reflection or absorption of electromagnetic waves or sonic waves for detecting the liquid level in the measuring chamber,
(c) a pressure compensator conduit communicating the spaces above the liquid levels within the reservoir and the measuring chamber, and
(d) heating means for keeping the liquid compensator conduit and the measuring chamber at a constant temperature.

The measuring apparatus according to the invention permits accurate measurement of the oil consumption with the engine running while any structural alteration of the engine is avoided, which means that the measurement can be performed with a production engine. Due to the fact that the temperature in the liquid compensator conduit and in the measuring chamber is kept constant it is possible to prevent inaccuracies caused by temperature variations of the liquid in the measuring chamber. This permits the desirable accuracy of measurement. Thus, the above described demands of a design engineer can be fully satisfied with the measuring apparatus according to the invention.

A level measuring means comprising a level sensor disposed above the liquid level has been found especially suitable for the purposes of the invention; said sensor emits à sonic signal and by detecting the propagation of the sonic signal reflected from the liquid level generates an output signal representative thereof. Such a sensor is commercially available (Luftschall-Abstandsmeßgerät LAM 80 made by Krautkrämer).

Suitably, an evaluator unit is provided for correcting the measured level values generated by the level measuring means in response to the temperature within the space above the liquid level in the measuring chamber and the temperature of the liquid in the liquid compensator conduit. In this connection it is advantageous in connection with the sonic signal emitting sensor to provide a gas thermometer for measuring the temperature in the space above the liquid level in the measuring chamber, the output signal of said gas thermometer being used for directly correcting the measured level signal under consideration of the relationship between sound propagation and temperature of the sound-transmitting medium.

So as to permit the temperature of the liquid in the liquid compensator conduit and the measuring chamber, respectively, to be kept constant it is advantageously provided in a concrete embodiment of the invention that a liquid thermometer for measuring the temperature of the liquid in the liquid compensator conduit is provided either in or near the opening thereof into the measuring chamber or beneath the liquid level in said measuring chamber itself, and that the output signal from the liquid thermometer is supplied to a control unit connected to the evaluator unit for acting on the heating means.

An embodiment of the invention will be explained in detail hereinbelow with reference to a schematic drawing. The single figure shows a partially sectional view of the conventional oil pan of an internal combustion engine with the measuring apparatus of the invention connected thereto.

The single figure illustrates a measuring apparatus for measuring the oil consumption of an internal combustion engine 1 having a conventional oil pan 2. The sump 4 of the oil pan 2 is connected via a liquid compensator conduit 6 to a measuring chamber 8 disposed approximately at the same level as the oil pan. The measuring chamber 8 and the portion of the liquid compensator conduit 6 extending towards the same are provided with a thermally insulating sheath 10. Within said sheath 10, both the measuring chamber 8 and the liquid compensator conduit 6 are surrounded by helical heating means 12. The oil rises in the measuring chamber 8 in accordance with the principle of communicating tubes to an oil level 14 corresponding to the oil level 16 within the oil pan. Due to the different temperatures in the measuring chamber 8 and the oil pan 2, the oil levels 14, 16 do not necessarily coincide.

The space 18 above the oil level 14 of the measuring chamber 8 is filled with air. Since the space 18 communicates via a pressure compensator conduit 20 with the space 22 above the oil level 16, the pressures in the spaces 18, 22 are balanced. The top wall of the measuring chamber 8 is provided with level measuring means implemented in the form of a level sensor 24, which emits a sonic signal and by measuring the propagation time of the sonic signal reflected from the liquid level 14 supplies a corresponding voltage $V_a$ via the signal flow line 26. The sidewall of the measuring chamber 8 is provided with a gas thermometer, for instance a conventional iron-constantan-thermocouple 28, which is used to measure the temperature of the air inside the space 18 and generates an output voltage signal $T_L$ representative of the temperature $t_L$ within the space 18 via the signal flow line 30. A liquid thermometer 32, which may likewise be a conventional thermo-couple, is installed in the liquid compensator conduit 6 in the vicinity of the opening 34 thereof into the measuring chamber 8 and supplies a voltage signal $T_{Fl}$ representative of the temperature $t_{Fl}$ via the signal flow line 35. The signal flow lines 26 and 30 constitute two inputs to an evaluator unit 36 which includes a computer 38. Moreover, the evaluator unit 36 has a control unit 40 connected thereto which has the signal flow line 35 as one input thereto. The control unit 40 may act on the heating means 12 by means of a control signal H via a signal flow line 42.

A printer 46 and a graphic display terminal 48 including an input keyboard 50 are connected to the evaluator unit.

The operation of the described measuring apparatus is as follows:

The oil flows via the liquid compensator conduit 6, which is kept at a constant temperature, from the oil pan 2 into the measuring chamber 8 held at the same temperature as the liquid compensator conduit 6, or vice versa, until the two oil colimns in the measuring chamber 8 and in the oil pan 2 are balanced. The level of the oil column in the measuring chamber 8 is representative of the mass of the oil in the oil pan. Identical levels will be obtained when the two oil columns are at the same temperature and the pressure above the oil levels is identical. If the temperature of the oil in the oil pan 2 varies, the oil volume in the engine will vary due to thermal expansion, and the two oil levels 14, 16 will no longer be at the same level. Since the weight of the two oil columns has not altered, the oil level 14 in the measuring chamber 8 still represents the correct mass of the oil quantity filled into the oil pan 2.

With the engine running and at constant operating conditions, which are characterized by the speed of revolution, the load and the temperature, only a portion of the total oil quantity will be left in the oil pan while the remaining portion of the oil is distributed to other locations of the internal combustion engine. However, the oil level 14 in the measuring chamber 8 still represents the oil quantity left in the oil pan.

Variations of this oil quantity with time due to oil consumption will be detected by a lowering of the oil level 14 in the measuring chamber 8 in the following manner: By measuring the propagation of the sonic signal emitted by the level sensor 24 along the distance a to the oil level 14 in the measuring chamber 8 and measuring the reflected sonic signal, one obtains a measured quantity representative of the level 14 of the oil. Since the sonic speed depends on the density of the transmission medium (air) and the temperature thereof, the temperature $t_L$ is detected by means of the gas thermometer 28. The output signals from the level sensor 24 and the gas thermometer 28 are inputted into the evaluator 36. Simultaneously, the temperature of the liquid in the compensator conduit 6 near the opening 34 of the liquid compensator conduit 6 into the measuring chamber 8 is detected and delivered to the control unit 40 as a temperature signal $T_{Fl}$. The control unit, which is in data exchange communication with the evaluator unit 36, then acts on the heating means 12 via a control unit output signal H—taking into account a correction signal in which the level signal is corrected in response to the respective prevailing temperature in the space 18 of the measuring chamber 8 and the temperature of the liquid in the liquid compensator conduit 6 and which is delivered from the evaluator unit 36 to the control unit 40—such that the temperature in the measuring chamber and in the compensator conduit 6 is maintained at a predetermined constant set-point value irrespective of the temperature in the oil pan 2.

In this connection the computer 38 of the evaluator unit 36 has the following functions:

it converts the voltage signal $V_a$ obtained from the level sensor 24 into a distance signal representative of the distance;

it takes into account the normally non-linear function between the volume of the oil pan and the oil level in the oil pan;

it takes into account the respectively used oil grade by means of multiplication by the respective specific gravity of the used oil;

it rejects measured level values which cannot be due to oil consumption, because the change of level per unit of time is too rapid to be justified by an oil consumption;

during short periods of time, e.g. one second to one minute, it records the distribution of the oil level with time and forms a mean value while taking into account a statistical measure of dispersion;

it outputs the oil quantity consumed, based on the starting point of the measurement or on the residual quantity of oil still present at the time of interrogation, and selectively or simultaneously transmits said output to the printer 46 and the display terminal 48.

In the measuring apparatus according to the invention, the heating means has two functions. On the one hand, it prevents errors in measurement due to temperature differences in the compensator conduit 6 and the measuring chamber 8. On the other hand, it permits setting of the temperature of the oil in the compensator conduit 6 and in the measuring chamber 8 to a value of a desired small viscosity, so that the friction in the liquid compensator conduit 6 is sufficiently small to obtain rapid balancing of any difference in the levels within the measuring chamber 8 and the oil pan 2.

I claim:

1. A measuring apparatus for measuring the consumption of liquid oil in an internal combustion engine with an oil reservoir, comprising:
   (a) a measuring chamber (8);
   (b) a liquid compensator conduit (6) communicating the oil reservoir and the measuring chamber below the liquid oil levels in said oil reservoir and in said measuring chamber;
   (c) level measuring means (24) based on measuring at least one of the reflection and absorption of at least one of electromagnetic waves and sonic waves for providing an indication of the liquid oil level (14) in the measuring chamber (8);
   (d) a pressure compensator conduit (20) communicating the spaces (18, 22) above the liquid oil levels (16, 14) within the reservoir (22) and the measuring chamber (8);
   (e) first temperature measuring means for providing a measurement of the temperature within the space (18) above the liquid oil level (14) in the measuring chamber (8);
   (f) second temperature measuring means for providing a measurement of the temperature of the liquid oil in the liquid compensator conduit (6);
   (g) heating means for keeping the liquid compensator conduit (6) and the measuring chamber (8) at a constant temperature; and
   (h) an evaluator unit (36) for correcting said indication in response to the temperature within the space (18) above the liquid oil level (14) in the measuring chamber (8) and the temperature of the liquid oil in the liquid compensator conduit (6).

2. An apparatus as claimed in claim 1, wherein said level measuring means comprises a level sensor (24) disposed above the liquid oil level (14) in the measuring chamber for emitting a sonic signal and for generating an output signal ($V_a$) representative of said liquid oil level in the reservoir by detecting the sonic signal reflected from said liquid oil level in the measuring chamber.

3. An apparatus as claimed in claim 2, wherein said first temperature measuring means comprises a gas thermometer (28) having a signal for correcting the output signal of said level sensor under consideration of the relationship between the speed of said sonic signal and said temperature within the space above the liquid oil level in the measuring chamber.

4. An apparatus as claimed in claim 1, wherein said second temperature measuring means comprises a liquid thermometer (32) in at least one of (a) an opening (34) of said liquid compensator conduit into the measuring chamber (8) and (b) beneath the liquid oil level (14) in said measuring chamber itself, wherein the liquid thermometer (32) is operatively connected to a control unit (40) connected to the evaluator unit (36) for controlling the heating means (12).

5. An apparatus as claimed in claim 2, wherein said second temperature measuring means comprises a liquid thermometer (32) in at least one of (a) an opening (34) of said liquid compensator conduit into the measuring chamber (8) and (b) beneath the liquid oil level (14) in said measuring chamber itself, wherein the liquid thermometer (32) is operatively connected to a control unit (40) connected to the evaluator unit (36) for controlling the heating means (12).

6. An apparatus as claimed in claim 3, wherein said second temperature measuring means comprises a liquid thermometer (32) in at least one of (a) an opening (34) of said liquid compensator conduit into the measuring chamber (8) and (b) beneath the liquid oil level (14) in said measuring chamber itself, wherein the liquid thermometer (32) is operatively connected to a control unit (40) connected to the evaluator unit (36) for controlling the heating means (12).

7. An apparatus as claimed in claim 1, wherein the evaluator unit (36) comprises a computer (38).

8. The apparatus of claim 1 wherein said heating means maintains the temperature of the oil such that the viscosity of the oil permits rapid movement of the oil between the measuring chamber and the oil reservoir.

* * * * *